US010157074B2

(12) United States Patent
Khemani

(10) Patent No.: US 10,157,074 B2
(45) Date of Patent: Dec. 18, 2018

(54) SYSTEMS AND METHODS FOR MULTI-ROOT INPUT/OUTPUT VIRTUALIZATION-BASED MANAGEMENT BY SINGLE SERVICE PROCESSOR

(71) Applicant: Dell Products L.P., Round Rock, TX (US)

(72) Inventor: Lucky Pratap Khemani, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 14/885,164

(22) Filed: Oct. 16, 2015

(65) Prior Publication Data
US 2017/0109185 A1   Apr. 20, 2017

(51) Int. Cl.
G06F 9/455        (2018.01)
G06F 13/40        (2006.01)
G06F 13/42        (2006.01)

(52) U.S. Cl.
CPC .......... *G06F 9/45558* (2013.01); *G06F 9/455* (2013.01); *G06F 9/45533* (2013.01); *G06F 9/45545* (2013.01); *G06F 13/4022* (2013.01); *G06F 13/4282* (2013.01); *G06F 2009/45579* (2013.01); *G06F 2009/45583* (2013.01); *G06F 2009/45587* (2013.01); *G06F 2009/45595* (2013.01)

(58) Field of Classification Search
CPC .. G06F 9/455; G06F 9/45533; G06F 9/45545; G06F 9/45558; G06F 2009/45579; G06F 2009/45583; G06F 2009/45587; G06F 2009/45595
See application file for complete search history.

(56) References Cited

U.S. PATENT DOCUMENTS

| 2006/0218261 | A1* | 9/2006 | Shen | G06F 9/5077 709/223 |
| 2008/0126635 | A1* | 5/2008 | Kawai | G11B 33/125 710/105 |
| 2009/0276773 | A1* | 11/2009 | Brown | G06F 9/45558 718/1 |

(Continued)

Primary Examiner — Charles M Swift
(74) Attorney, Agent, or Firm — Jackson Walker L.L.P.

(57) ABSTRACT

In accordance with embodiments of the present disclosure, a system may include a chassis configured to receive a plurality of modular information handling systems, a switch configured to be communicatively coupled to modular information handling systems received in the chassis, and a physical service processor communicatively coupled to the switch. The physical service processor may be configured instantiate one or more virtual service processors, each of the one or more virtual service processors allocated to an associated modular information handling system received in the chassis and configured to provide for out-of-band management of its associated modular information handling system and instantiate one or more virtual functions, each of the one or more virtual functions allocated to an associated virtual service processor and associated modular information handling system received in the chassis and configured to provide a communications interface between its associated virtual service processor and associated modular information handling system.

21 Claims, 3 Drawing Sheets

(56) References Cited

U.S. PATENT DOCUMENTS

| | | | | |
|---|---|---|---|---|
| 2010/0082874 | A1* | 4/2010 | Baba | G06F 3/0227 710/316 |
| 2011/0138044 | A1* | 6/2011 | Bailey | H04L 12/12 709/225 |
| 2011/0145558 | A1* | 6/2011 | Khosravi | G06F 9/4416 713/2 |
| 2011/0191518 | A1* | 8/2011 | Srinivasan | G06F 5/00 710/311 |
| 2012/0179932 | A1* | 7/2012 | Armstrong | G06F 11/20 714/4.11 |
| 2012/0185632 | A1* | 7/2012 | Lais | G06F 13/404 710/308 |
| 2012/0246644 | A1* | 9/2012 | Hattori | G06F 9/4411 718/1 |
| 2012/0284437 | A1* | 11/2012 | Ayzenfeld | G06F 13/387 710/104 |
| 2012/0284448 | A1* | 11/2012 | Ayzenfeld | G06F 13/105 710/313 |
| 2013/0111197 | A1* | 5/2013 | Nadon | G06F 8/60 713/1 |
| 2013/0152075 | A1* | 6/2013 | Cardona | G06F 9/45558 718/1 |
| 2013/0159572 | A1* | 6/2013 | Graham | G06F 13/387 710/104 |
| 2013/0160002 | A1* | 6/2013 | Graham | G06F 9/45558 718/1 |
| 2013/0205296 | A1* | 8/2013 | Cardona | G06F 9/542 718/1 |
| 2014/0173600 | A1* | 6/2014 | Ramakrishnan Nair | G06F 9/461 718/1 |
| 2014/0215458 | A1* | 7/2014 | Devarapalli | G06F 9/455 718/1 |
| 2015/0095445 | A1* | 4/2015 | Thankappan | H04L 45/125 709/214 |
| 2015/0381495 | A1* | 12/2015 | Cherian | H04L 45/745 370/392 |
| 2016/0077847 | A1* | 3/2016 | Hunter | G06F 13/20 718/1 |
| 2016/0350151 | A1* | 12/2016 | Zou | G06F 9/45558 |
| 2017/0277573 | A1* | 9/2017 | Huynh | G06F 9/5077 |

* cited by examiner

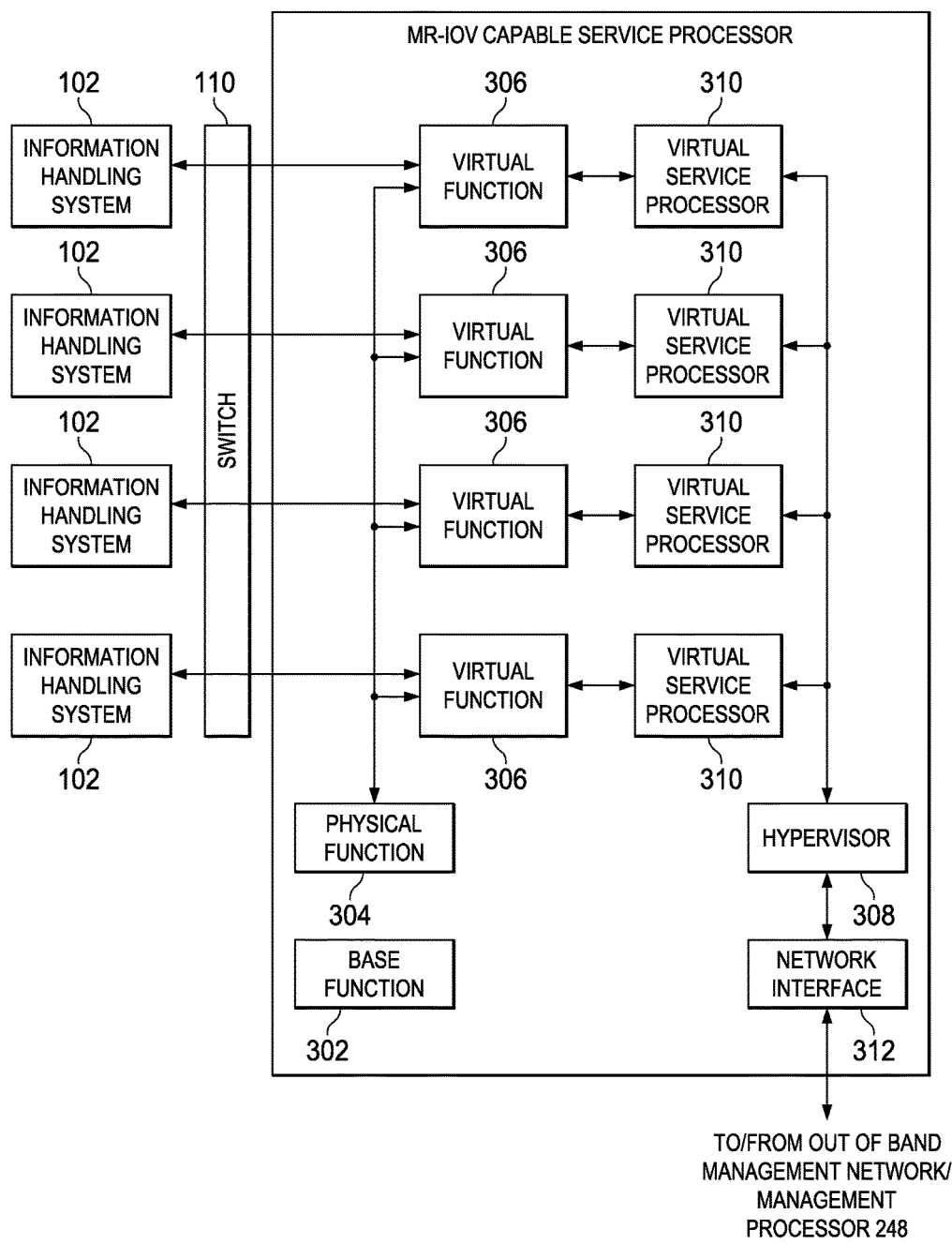

SYSTEMS AND METHODS FOR MULTI-ROOT INPUT/OUTPUT VIRTUALIZATION-BASED MANAGEMENT BY SINGLE SERVICE PROCESSOR

TECHNICAL FIELD

The present disclosure relates in general to information handling systems, and more particularly to systems and methods for providing multi-root input virtualization-based management of multiple information handling systems by a single service processor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, management of information handling systems, particularly in a server chassis comprising multiple information handling systems (e.g., blades/servers), has become increasingly complex. Accordingly, using traditional approaches in which each information handling system gas a dedicated physical service processor for management of the information handling system has become very costly and complex.

SUMMARY

In accordance with the teachings of the present disclosure, the disadvantages and problems associated with out-of-band management of information handling systems may be reduced or eliminated.

In accordance with embodiments of the present disclosure, a system may include a chassis configured to receive a plurality of modular information handling systems, a switch configured to be communicatively coupled to modular information handling systems received in the chassis, and a physical service processor communicatively coupled to the switch. The physical service processor may be configured instantiate one or more virtual service processors, each of the one or more virtual service processors allocated to an associated modular information handling system received in the chassis and configured to provide for out-of-band management of its associated modular information handling system and instantiate one or more virtual functions, each of the one or more virtual functions allocated to an associated virtual service processor and associated modular information handling system received in the chassis and configured to provide a communications interface between its associated virtual service processor and associated modular information handling system.

In accordance with these and other embodiments of the present disclosure, a physical service processor may be configured to instantiate one or more virtual service processors, each of the one or more virtual service processors allocated to and communicatively coupled via a switch to an associated modular information handling system received in a chassis and configured to provide for out-of-band management of its associated modular information handling system and instantiate one or more virtual functions, each of the one or more virtual functions allocated to an associated virtual service processor and associated modular information handling system received in the chassis and configured to provide a communications interface between its associated virtual service processor and associated modular information handling system.

In accordance with these and other embodiments of the present disclosure, a method may include instantiating one or more virtual service processors on a physical service processor, each of the one or more virtual service processors allocated to and communicatively coupled via a switch to an associated modular information handling system received in a chassis and configured to provide for out-of-band management of its associated modular information handling system. The method may also include instantiating one or more virtual functions on the physical service processor, each of the one or more virtual functions allocated to an associated virtual service processor and associated modular information handling system received in the chassis and configured to provide a communications interface between its associated virtual service processor and associated modular information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a block diagram of functional components of an MR-IOV capable service processor, in accordance with embodiments of the present disclosure.

DETAILED DESCRIPTION

Figure 1:
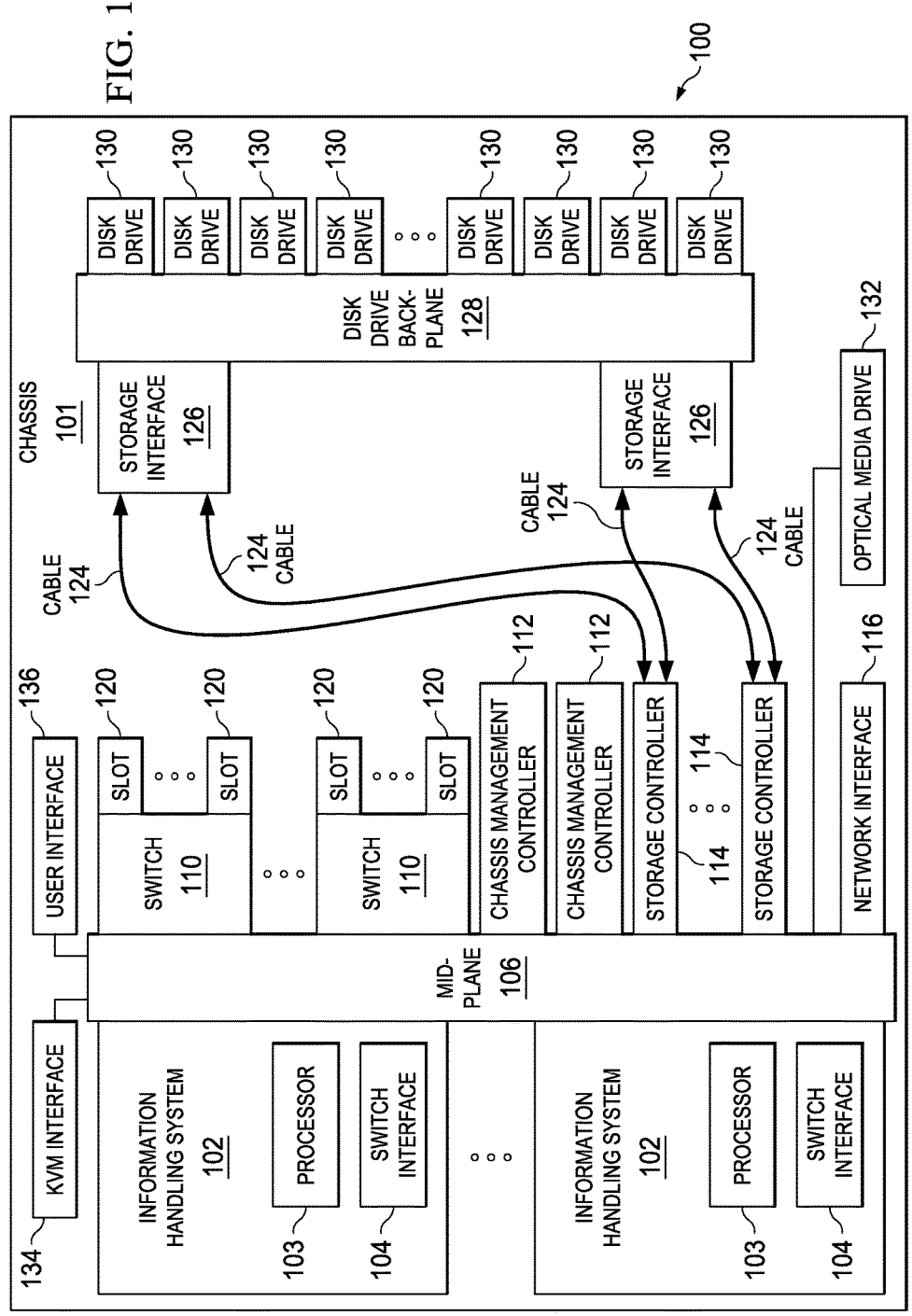
FIG. 1 illustrates a block diagram of an example system chassis with multiple information handling systems and with various peripheral and I/O capabilities common to the chassis as a whole, in accordance with embodiments of the present disclosure.
Figure 2:
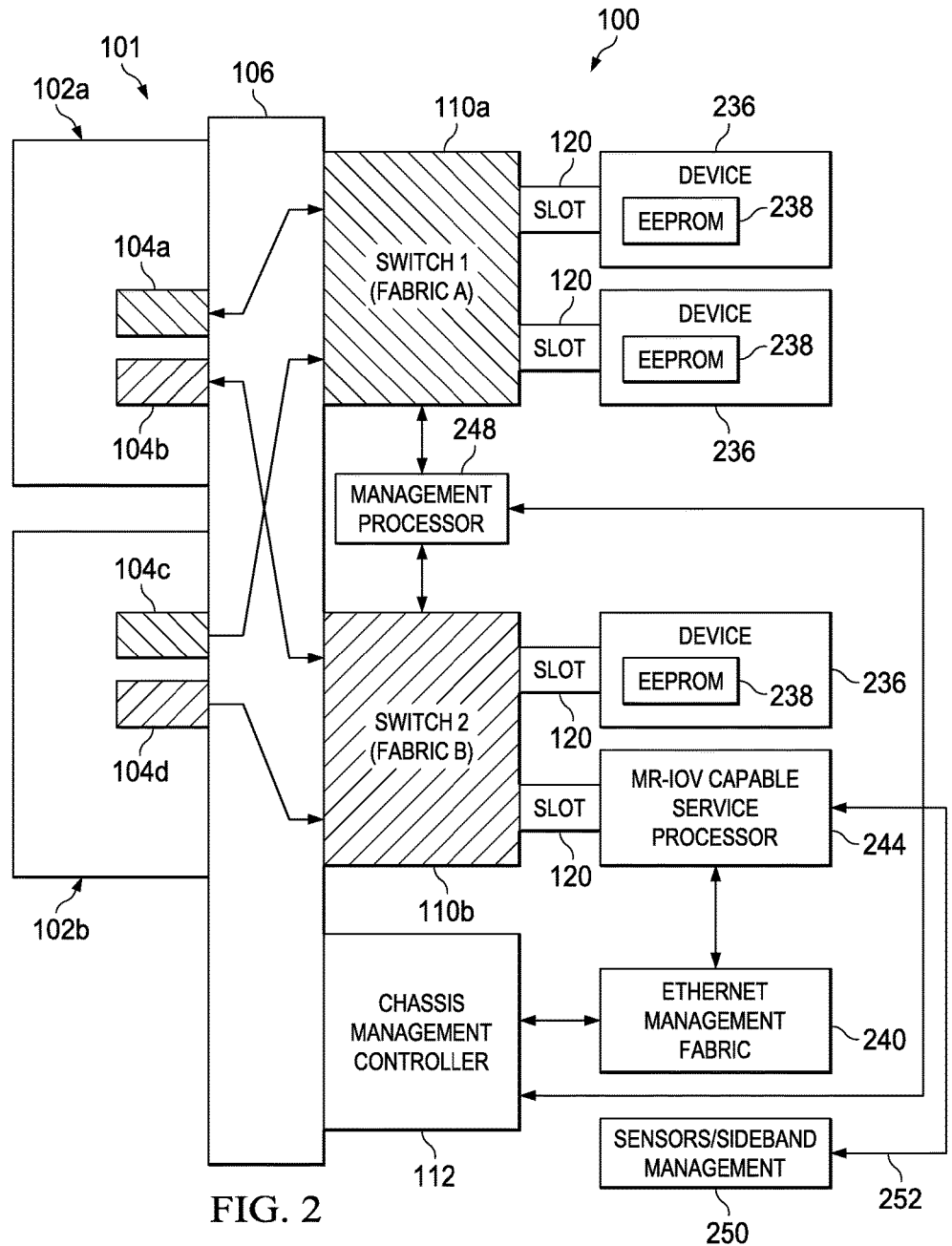
FIG. 2 illustrates a more detailed block diagram of an example system configured for switches and devices in a multi-root I/O virtualization environment for multiple information handling systems, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system 102 may comprise a blade server having modular physical design. In these and other embodiments, an information handling system 102 may comprise an M class server. As depicted in FIG. 1, an information handling system 102 may include a processor 103, and one or more switch interfaces 104 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller 112 may define configurations of the storage subsystem (e.g., storage controllers 114, storage interfaces 126, disk drives 130, etc.) of system 100. For example, a chassis management controller 112 may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). Although FIG. 1 depicts chassis 101 as having two chassis management controllers 112, chassis 101 may include any suitable number of chassis management controllers 112.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface 126 may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives 130 may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling resources (e.g., PCIe adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at a time. Chassis management controller 112 may be configured to handle routing and switching through switches 110 to affect sharing of a resource to multiple information handling systems 102 or to affect dedicated assignment of a resource to a single information handling system 102.

FIG. 2 illustrates a more detailed block diagram of example system 100 configured for switches and devices in a multi-root I/O virtualization ("IOV") environment for multiple information handling systems 102, in accordance with embodiments of the present disclosure.

As shown in FIG. 2, chassis 101 may include a management processor 248 communicatively coupled to one or more of chassis management controller 112 and switches 110. Management processor 248 may be any system, device, or apparatus configured to facilitate management and/or control of switches 110. For example, management processor 248 may provide management of input/output hierarchy resources in the MR-IOV system shown in FIG. 2. For example, management processor 248 may interface with a switch 110 via a sideband interface physically independent of the communications path between switch interfaces 104 and switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots 120 of chassis 101 to multiple information handling systems 102. The APIs of management processor 248 may provide the interface to chassis management controller 112 for configuring IOV. Management processor 248 may be configured to manage both switches 110. In one embodiment, management processor 248 may be communicatively coupled to an Ethernet management fabric 240. In these and other embodiments, chassis management controller 112 may be communicatively coupled to information handling systems 102 through Ethernet management fabric 240 and virtual service processor instantiated on MR-IOV capable service processor 244, as described in greater detail below. Management processor 248 may be directly communicatively coupled to the Ethernet management fabric 240 or through, for example, chassis management controller 112.

Although FIG. 2 depicts management processor 248 operable to facilitate management and/or control of switches 110, in some embodiments of the present disclosure, one or more chassis management controllers 112 may be configured to perform the functionality of management processor 248, in which a management processor 248 independent of the chassis management controllers 112 may not be present. In these and other embodiments, one or more processors 103 of information handling systems 102 may be configured to perform the functionality of management processor 248, in which a management processor 248 independent of information handling systems 102 may not be present.

Chassis 101 may include multiple information handling systems 102. Chassis 101 may include any suitable number of information handling systems 102. In some embodiments, information handling systems 102 may be referred to as "blades". Each information handling system 102 may include switch interfaces 104, as described in association with FIG. 1.

Switches 110 may contain PCIe cards instead of the typical blade Ethernet, Fibre Channel or InfiniBand cards. Switch interfaces 104 of the information handling systems 102 may couple to switches 110 through the switch interfaces 104 of switches 110. Switches 110 may couple information handling systems 102 to slots 120.

In one embodiment, each of information handling systems 102 may be communicatively coupled to each of switches 110 through one of switch interfaces 104 resident on the information handling system 102. For example, information handling system 102a may be communicatively coupled to switch 110a through switch interface 104a and to switch 110b through switch interface 104b. Information handling system 102b may be communicatively coupled to switch 110a through switch interface 104c and to switch 110b through switch interface 104d. Thus, each of switches 110 may provide its switching fabric to each of information handling systems 102 in order to route the given information handling system 102 to respective slots 120 associated with the switch 110.

Slots 120 may be configured to couple to associated devices (e.g., devices 236, MR-IOV capable service processor 244), though fewer devices may be present than the associated capacity of chassis 101. Chassis 101 may include any suitable number of slots 120. In some embodiments, devices 236 and/or MR-IOV capable service processor 244 may include PCIe-based cards or devices. Each such device 236 may represent an information handling resource to be selectively shared among multiple information handling systems 102 or dedicated to a single information handling system 102. A device 236 may comprise, for example, a RAID controller, network card, or other information handling resource. Furthermore, a device 236 may include a specific shared component such as a NIC. Devices 236 may include management information or circuitry configured to provide information to chassis 101 regarding the operation or specification of device 236. For example, a device 236 may include EEPROM 238 containing such information.

In order to support IOV, the driver and firmware of devices 236 and/or MR-IOV capable service processor 244 may include support for single root IOV (SR-IOV). To maintain routes between given information handling systems 102 and slots 120, switches 110 may include virtual hierarchies from slots 120 to information handling systems 102. Particular functions, such as virtual functions or shared functions, for SR-IOV for a given device 236/MR-IOV capable service processor 244 may be mapped in switch 110, providing behavior similar to multiple-root IOV (MR-IOV).

Thus, in such case, a switch 110 may be considered a Multi-Root Aware (MRA) switch which bridges MR-IOV to SR-IOV so that SR-IOV virtual functions may be exposed to a node as physical functions, such that an information handling system 102 is not aware that a given device 236/MR-IOV capable service processor 244 is shared. A given slot 120 or device 236/MR-IOV capable service processor 244 which has been virtualized may be accessed by two or more virtual functions, which allows the sharing of the resource. Physical functions, as opposed to the above-described virtual functions or shared functions, may be mapped or stored in management processor 248. A physical function representing an information handling resource may be provided to a single information handling system 102. Multiple instances of a virtual function may be provided to multiple information handling systems 102. If, for example, multiple information handling systems 102 are sharing a device 236/MR-IOV capable service processor 244, then access to such device 236/MR-IOV capable service processor 244 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

In some embodiments of system 100, many devices 236/MR-IOV capable service processors 244 of the same or similar functionality may be coupled to slots 120. In addition, such devices 236/MR-IOV capable service processors 244 may be shared among multiple information handling systems 102 or may be dedicated to a single information handling system 102.

Because information handling resources, such as those in devices 236/MR-IOV capable service processor 244 coupled to slots 120, are not located within an information handling system 102, but rather in a shared chassis using switches 110 to virtualize and route I/O communications among selected information handling systems 102, allocation of such information handling resources may not be directly controlled by an associated information handling system 102. Consequently, allocation of information handling resources such as devices 236/MR-IOV capable service processor 244 with information handling systems 102 in chassis 101 may be conducted by chassis management controller 112. For example, chassis management controller 112 may be configured to allocate or otherwise direct other components of chassis 101 to allocate devices 236/MR-IOV capable service processor 244 to information handling systems 102. It is noted that while the functionality described herein contemplates virtualization for shared devices 236/MR-IOV capable service processor 244, the functionality described herein may also be extended to nonshared devices as well.

As shown in FIG. 2, system chassis 101 may include internal switching fabrics (e.g., Fabric A and Fabric B). In the embodiments represented by FIG. 2, Fabric A is associated with switch 110a (labeled "Switch 1") and Fabric B is associated with switch 110b (labeled "Switch 2"). Although not depicted in FIG. 2, storage controllers 114 may each be associated with a particular switching fabric of chassis 101 (e.g., based upon a slot or connectors via which a particular storage controller 114 is coupled to mid-plane 106).

As discussed above, a device coupled to a slot 120 may comprise an MR-IOV capable service processor 244. MR-IOV capable service processor 244 may be implemented by, for example, a microprocessor, microcontroller, DSP, ASIC, EEPROM, or any combination thereof. MR-IOV capable service processor 244 may be configured to communicate with one or more of chassis management controllers 112 via midplane 106 (e.g., via a switch 110 and midplane 106) and/or via Ethernet management fabric 240 coupled between MR-IOV capable service processor 244 and chassis management controller 112. MR-IOV capable service processor 244 may be configured to provide out-of-band management facilities for management of information handling systems 102. Such management may be made by elements of chassis 101 even if information handling system 102 is powered off or powered to a standby state. MR-IOV capable service processor 244 may include a processor, memory, and network connection separate from the rest of information handling system 102. In certain embodiments, MR-IOV capable service processor 244 may include or may be an integral part of a baseboard management controller (BMC), Dell Remote Access Controller (DRAC) or an Integrated Dell Remote Access Controller (iDRAC). As indicated by its name, and as described in greater detail below, MR-IOV capable service processor 244 may be configured to instantiate multiple virtual service processors and associate each virtual service processor with a corresponding information handling system 102, thereby allowing out-of-band management of each information handling system as if it had a physical service processor integral thereto.

As also shown in FIG. 2, sensors and sideband management logic 250 may be communicatively coupled to MR-IOV capable service processor 244 via an Inter-Integrated Circuit (I2C) bus 252, which may be used for management and access to sensors of chassis 101 when an information handling system 102 is powered down.

FIG. 3 illustrates a block diagram of functional components of an MR-IOV capable service processor 244, in accordance with embodiments of the present disclosure. As shown in FIG. 3, MR-IOV capable service processor 244 may include a base function 302, a physical function 304, one or more virtual functions 306, a hypervisor 308, one or more virtual service processors 310, and a network interface 312. These components of MR-IOV capable service processor 244 may be implemented in hardware, software, firmware, or a combination thereof Base function 302 may include a function (e.g., a PCIe function) associated with an endpoint of an MR-IOV virtual hierarchy, and may manage the multi-root aware device that is MR-IOV capable service processor 244.

Physical function 304 may include a function (e.g., a PCIe function) configured to provide full PCIe functionality of MR-IOV capable service processor 244, including provision of MR-IOV capabilities and management of virtual functions 306.

A virtual function 306 may comprise a function (e.g., a PCIe function) which may be directly accessible to an information handling system 102 via a switch 110, and may include its own isolated memory space, work queue, interrupts, and command processing for communication of data between a virtual function 306 and an information handling system 102 allocated to such virtual function 306. In some embodiments, each virtual function 306 may be allocated to an associated virtual function 306.

Hypervisor 308 may comprise software and/or firmware generally operable to allow multiple virtual machines (e.g., virtual service processors 310) to run on a single computing system (e.g., MR-IOV capable service processor 244) at the same time. This operability is generally allowed via virtualization, a technique for hiding the physical characteristics of computing system resources (e.g., physical hardware of the computing system) from the way in which other systems, applications, or end users interact with those resources. Accordingly, hypervisor 308 may instantiate virtual service processors 310 and perform resource sharing on their behalf (e.g., by instantiating a virtual Ethernet controller/network interface) for each virtual service processor 310.

Hypervisor 308 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 308 may comprise a specially-designed OS with native virtualization capabilities. In another embodiment, hypervisor 308 may comprise a standard OS with an incorporated virtualization component for performing virtualization. In another embodiment, hypervisor 308 may comprise a standard OS running alongside a separate virtualization application. In these and other embodiments, hypervisor 308 may comprise a lightweight hypervisor.

A virtual service processor 310 may comprise a virtual machine configured to execute on hypervisor 308, and may comprise any system, device, or apparatus configured to emulate functionality of a physical service processor. In some embodiments, some or all virtual service processors 310 instantiated on a hypervisor 308 may execute Intelligent Platform Management Interface (IPMI) or other management standard or protocol. As shown in FIG. 3, each virtual service processor 310 may be allocated to an associated virtual function 306.

Network interface 312 may include any suitable system, apparatus, or device operable to serve as an interface between MR-IOV capable service processor 244 and an external out-of-band management network (e.g., a local area network or other network). Network interface 312 may enable MR-IOV capable service processor 244 to communicate with the external network using any suitable transmission protocol (e.g., TCP/IP) and/or standard (e.g., IEEE 802.11, Wi-Fi). In certain embodiments, network interface 312 may include a NIC. In the same or alternative embodiments, network interface 312 may be configured to communicate via wireless transmissions. In the same or alternative embodiments, network interface 312 may provide physical access to a networking medium and/or provide a low-level addressing system (e.g., through the use of Media Access Control addresses). In some embodiments, network interface 312 may be implemented as a LOM interface.

In operation, each information handling system 102 may be independently coupled to an associated virtual service processor 310 via a switch 110 (e.g., an MR-IOV capable PCIe switch) and an associated virtual function 306, such that each information handling system 102 may be managed by its associated virtual service processor 310, wherein each virtual service processor 310 may comprise a PCIe endpoint. In addition, each virtual service processor 310 may be managed via a management console communicatively coupled to MR-IOV capable service processor 244 via network interface 312.

Although systems and methods have been described herein with respect to a converged architecture (e.g., a system chassis with multiple information handling systems with various peripheral and I/O capabilities common to the chassis as a whole), identical, similar, or analogous systems and methods may be applied to monolithic server architectures or other architectures.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
a chassis configured to receive a plurality of modular information handling systems;
a switch configured to be communicatively coupled to modular information handling systems received in the chassis, wherein the received modular information handling systems are configured to communicate via an in-band network, and wherein at least some of the received modular information handling systems do not include a service processor therein; and
a physical service processor communicatively coupled to an out-of-band management network separate from the in-band network, and further communicatively coupled to the switch, the physical service processor configured to:
instantiate one or more virtual service processors, wherein a number of virtual service processors instantiated is equal to a number of modular information handling systems received in the chassis, each of the one or more virtual service processors being allocated to an associated one of the modular information handling system received in the chassis and configured to provide for out-of-band management of its associated modular information handling system, wherein the out-of-band management includes providing management access to the associated modular information handling system while the associated modular information handling system is in a physically powered off state; and instantiate one or more virtual functions, each of the one or more virtual functions allocated to an associated virtual service processor and associated modular information handling system received in the chassis and configured to provide a communications interface between its associated virtual service processor and associated modular information handling system.

2. The system of claim 1, wherein the switch comprises a multi-root input/output virtualization capable switch.

3. The system of claim 2, wherein the switch comprises a Peripheral Component Interconnect Express switch.

4. The system of claim 1, wherein the physical service processor comprises a multi-root input/output virtualization capable device.

5. The system of claim 4, wherein the physical service processor comprises a Peripheral Component Interconnect Express switch.

6. The system of claim 1, wherein each virtual service processor comprises a multi-root input/output virtualization endpoint.

7. The system of claim 1, wherein the physical service processor is further configured to execute a hypervisor, and wherein each of the one or more virtual service processors is configured to execute as a virtual machine on the hypervisor.

8. A physical service processor configured to:

instantiate one or more virtual service processors, each of the one or more virtual service processors being allocated to and communicatively coupled via a switch to an associated modular information handling system that is received in a chassis and configured to communicate via an in-band network, wherein a number of virtual service processors instantiated is equal to a number of modular information handling systems received in the chassis, wherein at least some of the received modular information handling systems do not include a service processor therein, each of the one or more virtual service processors being configured to provide for out-of-band management of its associated modular information handling system, wherein the physical service processor is communicatively coupled to an out-of-band management network separate from the in-band network, and wherein the out-of-band management includes providing management access to the associated modular information handling system while the associated modular information handling system is in a physically powered off state; and instantiate one or more virtual functions, each of the one or more virtual functions allocated to an associated virtual service processor and associated modular information handling system received in the chassis and configured to provide a communications interface between its associated virtual service processor and associated modular information handling system.

9. The physical service processor of claim 8, wherein the switch comprises a multi-root input/output virtualization capable switch.

10. The physical service processor of claim 8, wherein the switch comprises a Peripheral Component Interconnect Express switch.

11. The physical service processor of claim 8, wherein the physical service processor comprises a multi-root input/output virtualization capable device.

12. The physical service processor of claim 11, wherein the physical service processor comprises a Peripheral Component Interconnect Express switch.

13. The physical service processor of claim 8, wherein each virtual service processor comprises a multi-root input/output virtualization endpoint.

14. The physical service processor of claim 8, further configured to execute a hypervisor, wherein each of the one or more virtual service processors is configured to execute as a virtual machine on the hypervisor.

15. A method comprising:

instantiating one or more virtual service processors on a physical service processor, each of the one or more virtual service processors being allocated to and communicatively coupled via a switch to an associated modular information handling system that is received in a chassis and configured to communicate via an in-band network, wherein a number of virtual service processors instantiated is equal to a number of modular information handling systems received in the chassis, wherein at least some of the received modular information handling systems do not include a service processor therein, each of the one or more virtual service processors being configured to provide for out-of-band management of its associated modular information handling system, wherein the physical service processor is communicatively coupled to an out-of-band management network separate from the in-band network, and wherein the out-of-band management includes providing management access to the associated modular information handling system while the associated modular information handling system is in a physically powered off state; and instantiating one or more virtual functions on the physical service processor, each of the one or more virtual functions allocated to an associated virtual service processor and associated modular information handling system received in the chassis and configured to provide a communications interface between its associated virtual service processor and associated modular information handling system.

16. The method of claim 15, wherein the switch comprises a multi-root input/output virtualization capable switch.

17. The method of claim 16, wherein the switch comprises a Peripheral Component Interconnect Express switch.

18. The method of claim 15, wherein the physical service processor comprises a multi-root input/output virtualization capable device.

19. The method of claim 18, wherein the physical service processor comprises a Peripheral Component Interconnect Express switch.

20. The method of claim 15, wherein each virtual service processor comprises a multi-root input/output virtualization endpoint.

21. The method of claim 15, further comprising executing a hypervisor, wherein each of the one or more virtual service processors executes as a virtual machine on the hypervisor.

* * * * *